United States Patent [19]

Sakai et al.

[11] Patent Number: 5,559,803
[45] Date of Patent: Sep. 24, 1996

[54] COMMUNICATION SYSTEM USING A BIDIRECTIONAL TREE STRUCTURE NETWORK

[75] Inventors: Seiichiro Sakai, Tokyo; Yoshio Takeuchi, Saitama; Masayoshi Ohashi, Saitama; Toshio Mizuno, Saitama, all of Japan

[73] Assignee: Kokusai Denshin Denwa Co., Ltd., Tokyo, Japan

[21] Appl. No.: 494,086

[22] Filed: Jun. 23, 1995

[30] Foreign Application Priority Data

Jun. 28, 1994 [JP] Japan ................... 6-167562

[51] Int. Cl.⁶ .................................... H04H 1/02
[52] U.S. Cl. .................. 370/95.2; 370/85.8; 348/16; 455/5.1
[58] Field of Search ............... 348/6, 12, 13, 348/16; 455/3.1, 5.1, 6.1; 380/9, 42, 49; 370/58.3, 68, 85.7, 85.8, 92, 93, 95.1, 95.2

[56] References Cited

U.S. PATENT DOCUMENTS 3,997,718 12/1976 Ricketts et al. ................. 348/13
4,553,161 11/1985 Citta ............................... 348/10
5,070,528 12/1991 Hawe et al. ..................... 380/49
5,251,324 10/1993 McMullan Jr. .................. 455/5.1

*Primary Examiner*—Benedict V. Safourek
*Attorney, Agent, or Firm*—Nikaido Marmelstein Murray & Oram LLP

[57] ABSTRACT

A communication system includes a bidirectional tree network having a base end and a plurality of terminating ends, a central apparatus connected to the base end, a plurality of terminating equipment connected respectively to the terminating ends, and a plurality of subscriber terminals accommodated respectively in the terminating equipment. Each of the terminating equipment has a multiplexer for multiplexing information transmitted from the subscriber terminal accommodated therein to the central equipment, and a signal selection device for discriminating and selectively receiving only information which is destined for the subscriber terminal accommodated in this terminating equipment from information transmitted from the central apparatus to all the subscriber terminals via the tree network. The central apparatus has an exchange equipment for discriminating destination of information transmitted from the subscriber terminals via the tree network, and a loop back device for scrambling the information transmitted from the subscriber terminals via the tree network so that the scrambled signal can be decoded only by a signal selection device corresponding to the discriminated destination and for sending back the scrambled information to the tree network.

6 Claims, 5 Drawing Sheets

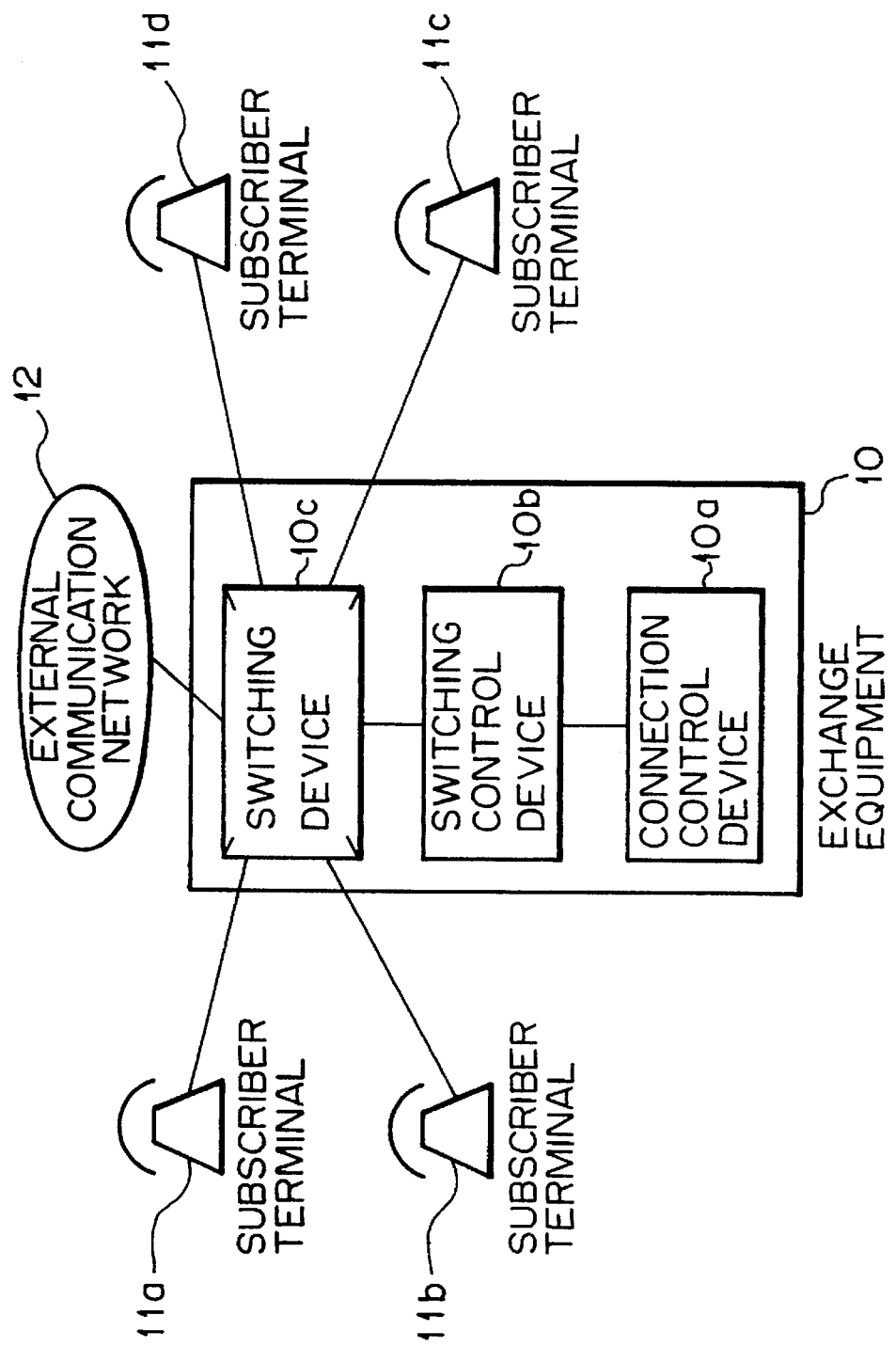

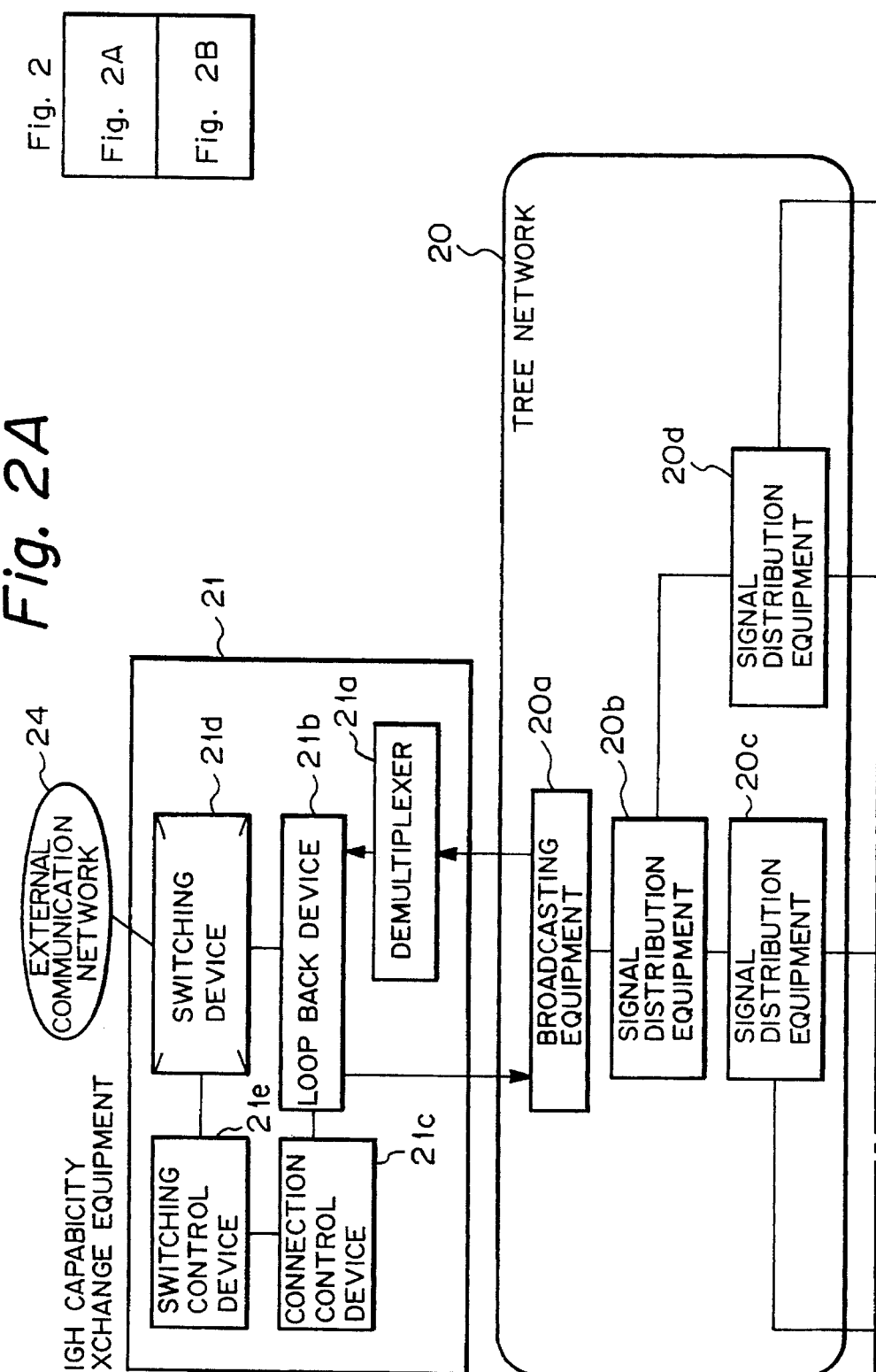

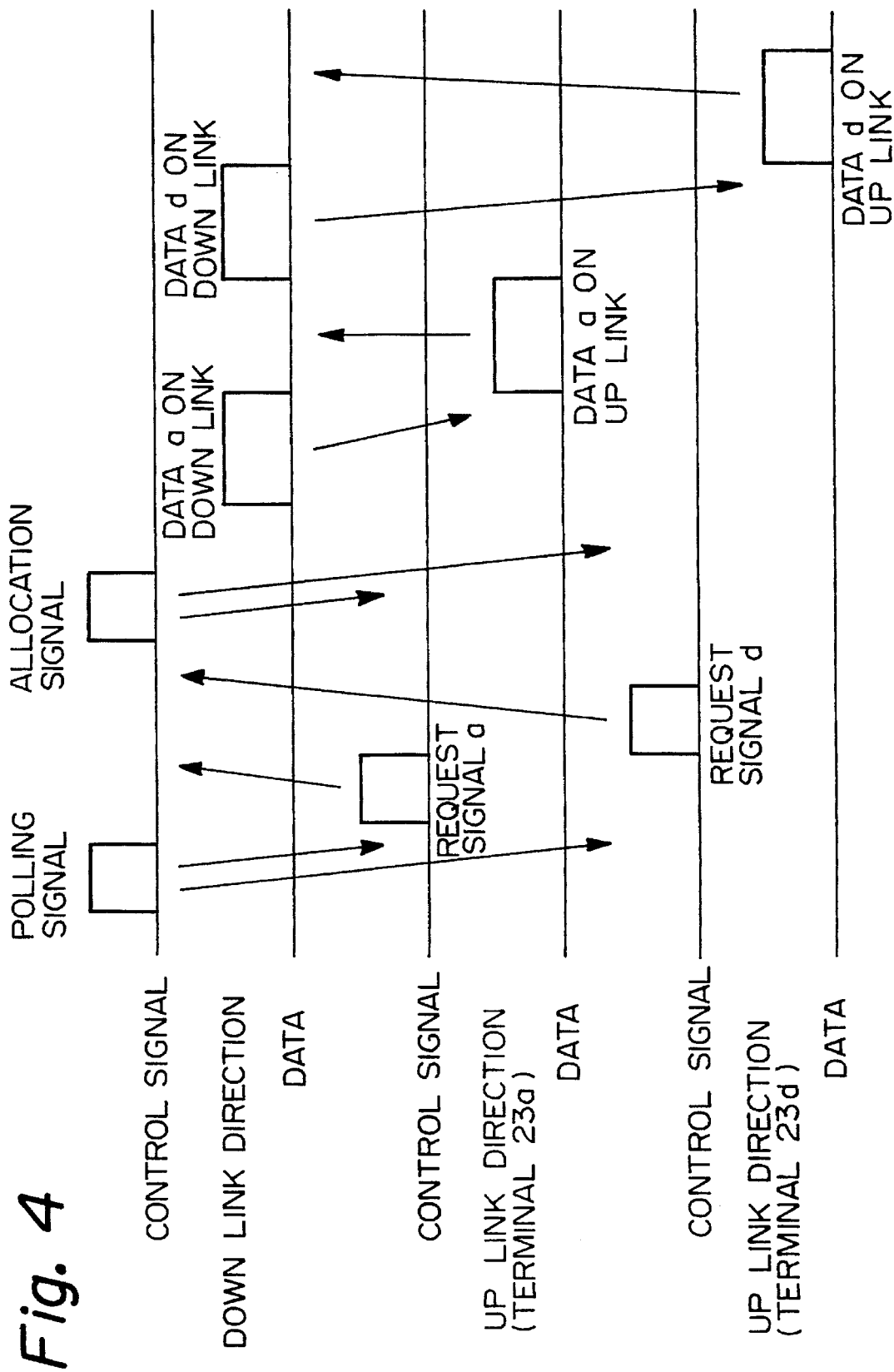

COMMUNICATION SYSTEM USING A BIDIRECTIONAL TREE STRUCTURE NETWORK

FIELD OF THE INVENTION

The present invention relates to a communication system using a network such as a CATV network, having a bidirectional tree structure.

DESCRIPTION OF THE RELATED ART

In a typical telephone network, a plurality of subscriber terminals and an exchange equipment are connected in a star structure. In FIG. 1 which shows such typical construction of the telephone network, reference numeral 10 denotes the exchange equipment, 11a to 11d denote subscriber terminals connected in a star structure with the exchange equipment 10, and 12 denotes an external communication network, respectively. The exchange equipment 10 includes a connection control device 10a, a switching control device 10b and a switching device 10c. When a connection request signal is provided from one of the subscriber terminals, the connection control device 10a interprets this request signal to specify an address of a subscriber terminal to be connected. Then, when the latter subscriber is specified, the connection control device 10a sends a connection command to the switching control device 10b so that both the subscriber terminals are connected with each other. The switching device 10c thus keeps the called subscriber terminal in a called state in accordance with the connection command from the connection control device 10a, and then establishes the connection between the calling and called subscriber terminals if the called subscriber terminal answers to the call.

In such a typical telephone network, all the functions for switching are usually concentrated in the central exchange equipment. Therefore, although this network can be appropriately adapted to the mutual communication between two subscribers, it cannot be adapted to multimedia services which need both communication processing and broadcast processing. Namely, in order to provide multimedia services, the network is required to have broadcast-type connecting function for simultaneously transmitting an information to a plurality of subscribers (such as multi-address calling) and multiple access function for simultaneously communicating a subscriber with a plurality of another subscribers. However, since the conventional telephone network does not have such functions, it is extremely difficult to realize various connections required for the multimedia services. For example, to transmit the same information to a plurality of subscribers, the central exchange equipment must have a switching device with very high capability for reproducing the information and for distributing the reproduced information to the each subscriber. The central exchange equipment of the conventional telephone network never have such the special switching device.

Furthermore, in order to transmit information at high rate in the conventional telephone network, high speed process is required for the switching control device so as to decentralize the load. However, this causes the manufacturing cost of the switching control device and the switching device to extremely increase.

Also, according to the conventional telephone network, since lines for new subscriber terminals are necessary to provide for accommodating them, the cost of providing these lines may be additionally increased.

SUMMARY OF THE INVENTION

It is therefore an object of the present invention to provide a communication system which is not necessary to have a special switching device with high capability for realizing multimedia services.

Another object of the present invention is to provide a communication system which needs no additional line for accommodating new subscriber.

According to the present invention, a communication system includes a bidirectional tree network having a base end and a plurality of terminating ends, a central apparatus connected to the base end, a plurality of terminating equipment connected respectively to the terminating ends, and a plurality of subscriber terminals accommodated respectively in the terminating equipment. Each of the terminating equipment has a multiplexer for multiplexing information transmitted from the subscriber terminal accommodated therein to the central equipment, and a signal selection device for discriminating and selectively receiving only information which is destined for the subscriber terminal accommodated in this terminating equipment from information transmitted from the central apparatus to all the subscriber terminals via the tree network. The central apparatus has an exchange equipment for discriminating destination of information transmitted from the subscriber terminals via the: tree network, and a loop back device for scrambling the information transmitted from the subscriber terminals via the tree network so that the scrambled signal can be decoded only by a signal selection device corresponding to the discriminated destination and for sending back the scrambled information to the tree network.

Hereinafter, the operation of this communication system will be described as for a case where a subscriber terminal A calls an another subscriber terminal B accommodated in the same bidirectional tree network. Calling information from the subscriber terminal A is multiplexed by the multiplexer belonging to this terminal A and then transmitted into the tree network. The exchange equipment in the central apparatus discriminates destination of the arrived information. If the discriminated destination is the subscriber terminal B accommodated in the same tree network, the exchange equipment directs the loop back device, to scramble this information so that the scrambled signal can be decoded only by the signal selection device belonging to the called subscriber terminal B and to send back the scrambled information to the tree network. Thus, this scrambled information is sent to all the terminating equipment via the tree network. Only the signal selection device belonging to the subscriber terminal B discriminates and selectively receives the information destined thereto from various information transmitted from the central apparatus to all the subscriber terminals via the tree network, and then calls the terminal B to connect with the calling subscriber terminal A. It is apparent that if a plurality of subscriber terminals are called (multiple access), the similar operation can be easily provided by modifying the scrambling method. Also, if the same information is simultaneously transmitted to a plurality of subscribers from the exchange equipment (broadcast type access), the similar operation can be easily provided by modifying the scrambling method.

According to the present invention, since the signal selection device in each of the terminating equipment carries out a part of the switching operation based upon a scrambled information which is provided from the loop back device in the central apparatus in response to a communication request signal from the subscriber terminal, distributed processing of the switching operation can be provided. Thus, the central apparatus needs not to have a switching device with very high capability in order to realize broadcast-type connecting function for simultaneously transmitting an information to a plurality of subscribers and multiple access function for simultaneously communicating a subscriber with a plurality of another subscribers.

It is preferred that the central apparatus further includes a demultiplexer for demultiplexing multiplexed signals transmitted from the terminating equipment via the tree network into respective time slot signals.

It is also preferred that the exchange equipment further includes a connection control device for discriminating destination of information transmitted from the subscriber terminals via the tree network, and for allocating channels to the respective terminating equipment. Namely, if the exchange equipment receives a communication request from the subscriber terminal A, the connection control device in the exchange equipment allocates channels to the respective subscriber terminals A and B, and informs the allocated result to these subscriber terminals. Thus, after that, all signals from the subscriber terminals A and B are transmitted through the allocated channels as multiplexed (time division multiplexed or frequency division multiplexed) signals, respectively.

Preferably, the exchange equipment further includes a switching device for processing connections with respect to an external communication network so as to send the information from the subscriber terminal to a subscriber in the external communication network at the discriminated destination. Since the exchange equipment participates only when the connection with the external network is carried out, decentralized processing of the switching operation can be expected.

The tree network may include a broadcasting equipment connected at the base end of the network, and a plurality of branched nodes and a plurality of signal distribution equipment inserted at the branched nodes, respectively.

Preferably, the tree network is constituted by a bidirectional CATV network. In this case, lines for new subscriber terminals are not necessary to provide for accommodating them.

Further objects and advantages of the present invention will be apparent from the following description of the preferred embodiments of the invention as illustrated in the accompanying drawings.

BRIEF DESCRIPTION OF THE DRAWINGS

FIG. 1 is a block diagram schematically showing the already mentioned typical telephone network;

FIG. 2 which is constituted by combining FIGS. 2A and 2B is a block diagram schematically showing a preferred embodiment of a communication system according to the present invention;

FIG. 4 is a timing chart illustrating the partial operation of a communication between the exchange equipment and the particular subscriber terminal, according to the embodiment shown in FIG. 1.

DESCRIPTION OF THE PREFERRED EMBODIMENTS

Figure 2B:
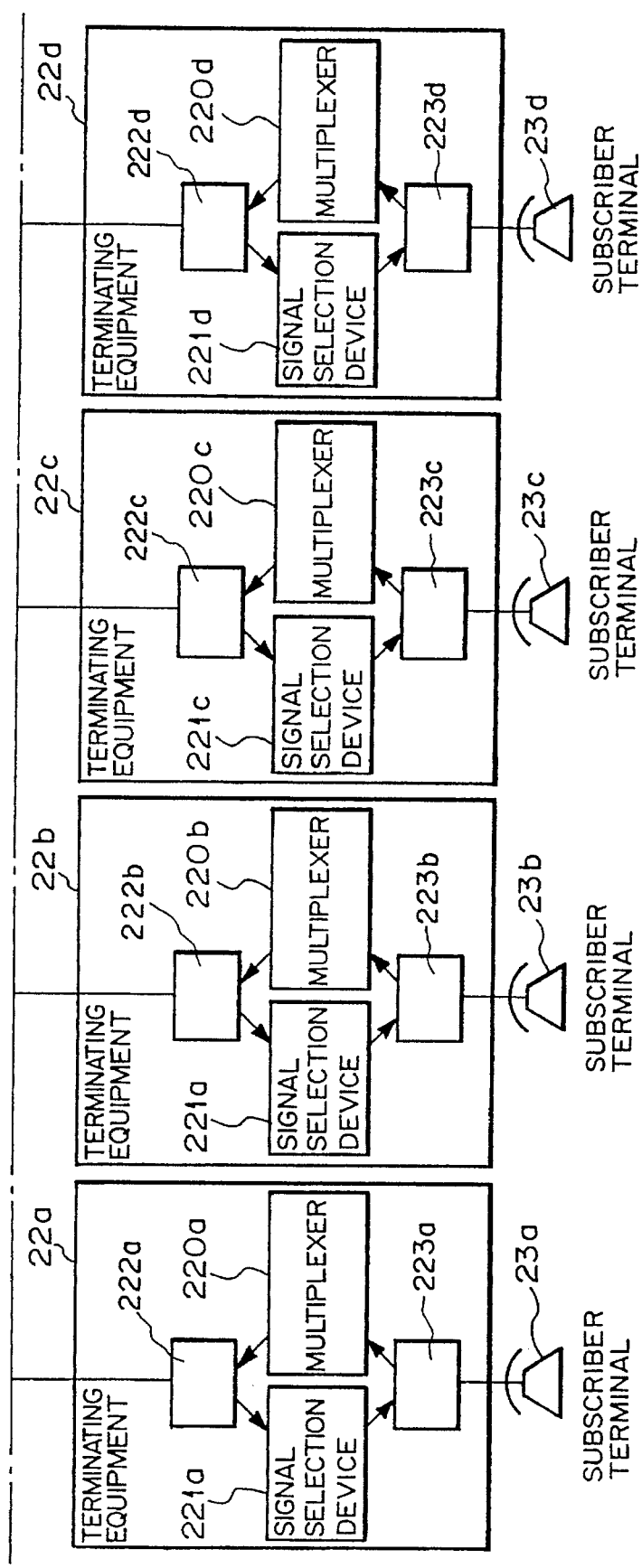

Referring to FIG. 2 which schematically shows a preferred embodiment of a communication system according to the present invention, reference numeral 20 denotes a bidirectional tree network, 21 denotes a high capability exchange equipment as a central apparatus connected to the base end of the tree network 20, 22a to 22d denote terminating equipment connected respectively to the terminating ends of the tree network 20, 23a to 23d denote subscriber terminals accommodated respectively in the terminating equipments 22a to 22d, and 24 denotes an external communication network connected to the exchange equipment 21. In order to clarify the figure, only four terminating ends, terminating equipment and subscriber terminals are illustrated in FIG. 2. However, in general, a great number of terminating equipment and subscriber terminals may be connected to the respective terminating ends of the tree network 20.

Preferably, the tree network 20 may be constituted by an already existing bidirectional tree network such as a bidirectional CATV network. In such a tree network, in general, broadcasting equipment 20a connected at the base end of the network, and signal distribution equipment 20b to 20d inserted respectively at branched nodes of the network are provided.

In the terminating equipment 22a to 22d, multiplexers 220a to 220d for multiplexing information transmitted from the subscriber terminals 23a to 23d toward the exchange equipment 21, and signal selection devices 221a to 221d are provided, respectively. Each of the signal selection devices 221a to 221d checks various information transmitted thereto via the tree network 20 and then selectively receives only information which is destined for the subscriber terminal connected to its terminating equipment (i.e. descrambles the information). Voice signal separation/synthesis devices 223a-223d each perform signal conversion between a two wire system for the subscriber terminal and a four wire system having separate input and output ports. Modulated signal separation/synthesis devices 222a-222d each separate and derive an input signal from the signals in the network cable and composite an output signal with the signals on the network cable.

The high capability exchange equipment (central apparatus) 21 includes a demultiplexer 21a for demultiplexing multiplexed signals transmitted from the terminating equipment 22a to 22d via the tree network 20 into respective time slot signals, a connection control device 21c for discriminating destination of a communication request signal and for managing all the control concerning connections in the exchange equipment 21, a loop back device 21b for scrambling information transmitted via the tree network 20 and for sending back the scrambled information to the tree network 20 again, a switching device 21d for processing connections with respect to an external communication network 24, and a switching control device 21e for controlling the switching operation of the switching device 21d in accordance with commands from the connection control device 21c.

Figure 3:
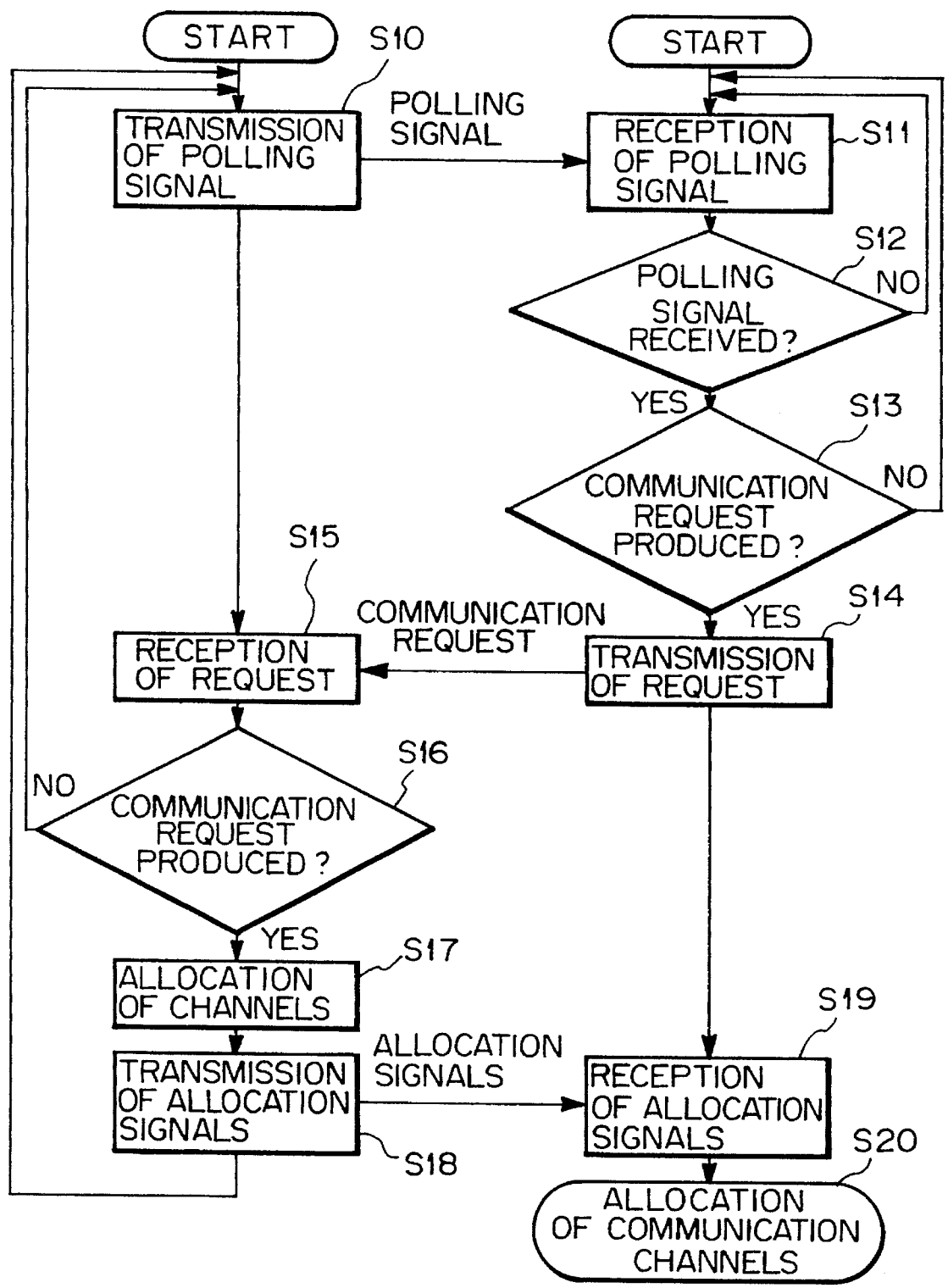
FIG. 3 is a flow chart illustrating a partial operation of a communication between an exchange equipment and a particular subscriber terminal, according to the embodiment shown in FIG. 1.

FIG. 3 is a flow chart illustrating a partial operation of a communication between the exchange equipment 21 and a particular subscriber terminal accommodated in the tree network 20, according to the embodiment shown in FIG. 1, and FIG. 4 is a its timing chart. Operation of this embodiment will be described with reference to these figures.

After a polling signal was sent to the terminating equipment from the connection control device 21c in the exchange equipment 21 and the terminating equipment receives it (steps S10 to S12), if communication request signals are produced from for example the terminating equipments 22a and 22d related to the respective subscriber terminals 23a and 23d, the request signals a and d are sent to the connection control device 21c in the exchange equipment 21 via the tree network 20 (steps S13 to S15). Namely, the loop back device 21b discriminates signals concerning to the connection control such as the communication request signal from various signals which are sent thereto via the tree network 20 from the subscriber terminals, and transmits it to the connection control device 21c.

The connection control device 21c interprets destination of the communication request signal and also allocates channels (time slots) used for the communications to the respective terminating equipment 22a and 22d (steps S16 and S17). The allocation signals are then fed to the respective terminating equipment 22a and 22d via the loop back device 21b (steps S18 to S20). After this allocation all signals from the terminating equipment 22a and 22d to the central exchange equipment 21 are transmitted through the allocated channels as multiplexed (time division multiplexed or frequency division multiplexed) signals, respectively. The signal frequencies on up links and down links in the tree network 20 will differ from each other.

In case that the calling subscriber terminal is a subscriber accommodated in the tree network 20 and that the called subscriber terminal is a subscriber located in the external communication network 24, the connection control device 21c sends a connection command to the switching control device 21e so as to link the calling subscriber terminal with the called subscriber terminal in the external network 24. Thus, the communication request signal from the calling subscriber via the allocated channel in the tree network 20 is demultiplexed by the demultiplexer 21a and applied to the switching device 21d via the loop back device 21b. The switching device 21d which is controlled by the switching control device 21e then sends the call to the external network 24.

In case that the calling subscriber terminal is a subscriber located in the tree network 20, for example the subscriber terminal 23a, and that the called subscriber terminal is a subscriber located in the same tree network 20, for example the subscriber terminal 23d, the connection control device 21c sends to the loop back device 21b a command for scrambling the communication request signal so that only the terminating equipment 22d, which accommodates the called subscriber terminal 23d, can decode the scrambled signal and can send back the scrambled signal to the tree network 20. Thus, the scrambled signal is sent to all the terminating equipment via the tree network 20. The signal selection device 221d in the terminating equipment 22d discriminates only a signal addressed to it from the various signals fed via the tree network 20 and selectively receives it. Then, the signal selection device 221d calls the subscriber terminal 23d, and establishes the connection between the calling and called subscriber terminals 23a and 23d if the called subscriber terminal 23d answers to the call.

Even if it is necessary to call a plurality of subscriber terminals (multiple access), the similar operation can be easily provided by modifying the scrambling method. Also, if it is necessary to simultaneously transmit the same information to a plurality of subscribers from the exchange equipment 21 (broadcast type access), the similar operation can be easily provided by modifying the scrambling method.

According to this embodiment as described above; since the signal selection device in each of the terminating equipment carries out a part of the switching operation based upon a selective reception command which is provided from the central exchange equipment in response to a communication request signal from the subscriber terminal, distributed processing of the switching operation can be provided. Thus, the central exchange equipment needs not to have a switching device with very high capability in order to realize broadcast-type connecting function for simultaneously transmitting an information to a plurality of subscribers and multiple access function for simultaneously communicating a subscriber with a plurality of another subscribers. Also, since the tree network can be constituted by an already existing bidirectional tree network such as a bidirectional CATV network, lines for new subscriber terminals are not necessary to provide for accommodating them.

Furthermore, since the central exchange equipment participates only when the, connection with the external network is carried out, decentralized processing of the switching operation can be expected. It is also advantageous that the terminating equipment can be manufactured by mass production causing their manufacturing cost to be reduced. Therefore, personal communication devices with high processing speed can be realized by using low cost switches.

Many widely different embodiments of the present invention may be constructed without departing from the spirit and scope of the present invention. It should be understood that the present invention is not limited to the specific embodiments described in the specification, except as defined in the appended claims.

What is claimed is:

1. A communication system comprising:

a bidirectional tree network having a base end and a plurality of terminating ends;

a central apparatus connected to said base end;

a plurality of terminating equipment connected respectively to said terminating ends; and a plurality of subscriber terminals accommodated respectively in said terminating equipment, each of said terminating equipment including a multiplexer for multiplexing information transmitted from one of the subscriber terminals accommodated therein to said central apparatus, and a signal selection device for discriminating and selectively receiving only information which is destined for the one of the subscriber terminals accommodated in this terminating equipment from information transmitted from said central apparatus to all the subscriber terminals via the tree network, said central apparatus including an exchange equipment for discriminating a destination of the information transmitted from said subscriber terminals via the tree network, and a loop back device for scrambling the information transmitted from the subscriber terminals via the tree network so that the scrambled signal can be decoded only by a signal selection device corresponding to the discriminated destination and for sending back the scrambled information to the tree network, wherein said central apparatus further includes a demultiplexer for demultiplexing multiplexed signals transmitted from the terminating equipment via the tree network into respective time slot signals.

2. The communication system as claimed in claim 1, wherein said exchange equipment further includes a connection control device for discriminating destination of information transmitted from said subscriber terminals via the tree network, and for allocating channels to the respective terminating equipment.

3. The communication system as claimed in claim 2, wherein said exchange equipment further includes a switching device for processing connections with respect to an external communication network so as to send the information from the subscriber terminal to a subscriber in the external communication network at the discriminated destination.

4. The communication system as claimed in claim 1, wherein said tree network includes broadcasting equipment connected at the base end of the network.

5. The communication system as claimed in claim 1, wherein said tree network includes a plurality of branched nodes and a plurality of signal distribution equipment inserted at the branched nodes, respectively.

6. The communication system as claimed in claim 1, wherein said tree network is constituted by a bidirectional CATV network.

* * * * *